United States Patent
Hsu et al.

(10) Patent No.: US 12,316,361 B2
(45) Date of Patent: May 27, 2025

(54) SIGNAL RECEIVING APPARATUS AND OPERATION METHOD THEREOF HAVING PHASE COMPENSATION MECHANISM

(71) Applicant: REALTEK SEMICONDUCTOR CORPORATION, Hsinchu (TW)

(72) Inventors: Hao-Han Hsu, Hsinchu (TW);
Chuan-Hu Lin, Hsinchu (TW);
Chung-Yao Chang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 367 days.

(21) Appl. No.: 18/075,459

(22) Filed: Dec. 6, 2022

(65) Prior Publication Data
US 2023/0283309 A1     Sep. 7, 2023

(30) Foreign Application Priority Data
Mar. 1, 2022   (TW) ................................. 111107345

(51) Int. Cl.
| | |
|---|---|
| H04B 1/12 | (2006.01) |
| H04B 1/10 | (2006.01) |
| H04B 1/18 | (2006.01) |

(52) U.S. Cl.
CPC .............. *H04B 1/12* (2013.01); *H04B 1/1027* (2013.01); *H04B 1/18* (2013.01); *H04B 2001/1054* (2013.01)

(58) Field of Classification Search
CPC .......... H04B 1/12; H04B 1/1027; H04B 1/18; H04B 2001/1054
See application file for complete search history.

(56) References Cited

U.S. PATENT DOCUMENTS 5,570,099 A * 10/1996 DesJardins ............... G01S 1/04
  342/449
9,154,969 B1 * 10/2015 Srinivasa ............... H04B 17/14
(Continued)

FOREIGN PATENT DOCUMENTS

| EP | 3826109 A1 | 5/2021 |
|---|---|---|
| WO | WO 2012/057573 A2 | 5/2012 |

OTHER PUBLICATIONS

OA letter of a counterpart TW application (appl. No. 111107345) mailed on Oct. 6, 2022.

*Primary Examiner* — Junpeng Chen
(74) *Attorney, Agent, or Firm* — WPAT, PC (57) ABSTRACT

The present invention discloses a signal receiving apparatus having phase compensation mechanism. A first and a second receiving path of a receiving circuit perform frequency down-conversion and analog-to-digital conversion on an input signal to generate a first and a second receiving signals. The first and the second receiving paths uses a RF training signal generated by a RF training signal generation circuit as the input signal when a phase compensation is performed, and use a data signal from an antenna circuit as the input signal when a beamforming signal receiving is performed. A phase difference calculation circuit of the receiving circuit performs cross-correlation operation on the first and the second receiving signals to generate a compensation signal according to a phase difference between the first and the second receiving paths. A phase compensation circuit of the receiving circuit performs compensation on the first receiving signal or the second receiving signal such that the first receiving signal and the second receiving signal have substantially identical phases after compensation.

14 Claims, 4 Drawing Sheets

(56) References Cited

U.S. PATENT DOCUMENTS

| | | | |
|---|---|---|---|
| 2004/0101073 A1* | 5/2004 | Doi | H04B 7/0851 |
| | | | 375/343 |
| 2005/0147190 A1* | 7/2005 | Nishikawa | H04L 27/0014 |
| | | | 375/343 |
| 2005/0157778 A1* | 7/2005 | Trachewsky | H04L 27/0014 |
| | | | 375/221 |
| 2011/0026570 A1* | 2/2011 | Feng | H04B 17/21 |
| | | | 455/226.1 |
| 2019/0238176 A1* | 8/2019 | Briand | H04B 1/709 |
| 2024/0248205 A1* | 7/2024 | Pichardo | G01S 7/52079 |

* cited by examiner

SIGNAL RECEIVING APPARATUS AND OPERATION METHOD THEREOF HAVING PHASE COMPENSATION MECHANISM

BACKGROUND OF THE INVENTION

1. Field of the Invention

The present invention relates to a signal receiving apparatus and a signal receiving apparatus operation method thereof having phase compensation mechanism.

2. Description of Related Art

In multi-antenna Wi-Fi applications, in order to allow a station device to receive downlink data from an access point device easily, beamforming technology can be used when both of the station device and the access point device support dual antenna communication. The access point device that operates as a beamformer aims the main beam of the dual antenna thereof toward the station device that operates as a beamformee to perform transmission. The station device can obtain a highest receiving gain accordingly.

In general, channel state information is required to be measured before the beamforming signal transmission is performed to assure the best transmission result can be obtained under the condition that phases of different receiving paths of the station device are known. However, when the station device switches to data transmission modes other than the dual antenna transmission mode between two beamforming signal transmissions, the phases of the different receiving paths change. A new measurement of the channel state information is required every time before the beamforming signal transmission is performed under such a condition and thus results in the waste of time and resource costs.

SUMMARY OF THE INVENTION

In consideration of the problem of the prior art, an object of the present invention is to supply a signal receiving apparatus and a signal receiving apparatus operation method thereof having phase compensation mechanism.

The present invention discloses a signal receiving apparatus having phase compensation mechanism configured to perform non-sounding beamforming communication that includes an RF training signal generation circuit, an antenna circuit and a receiving circuit. The RF training signal generation circuit is configured to generate a RF training signal. The antenna circuit is configured to receive a data signal transmitted by a signal transmitting apparatus. The receiving circuit includes a first receiving path, a second receiving path, a phase difference calculation circuit and a phase compensation circuit. The first receiving path and the second receiving path are configured to perform frequency down-conversion and analog-to-digital conversion according to an input signal to generate a first receiving signal and a second receiving signal, wherein the first receiving path and the second receiving path are electrically coupled to the RF training signal generation circuit when the receiving circuit performs phase compensation such that the RF training signal serves as the input signal, and are electrically coupled to the antenna circuit when the receiving circuit performs beamforming signal receiving such that the data signal serves as the input signal. The phase difference calculation circuit is configured to perform cross-correlation operation on the first receiving signal and the second receiving signal when the receiving circuit performs phase compensation to generate a phase difference compensation signal according to a phase difference between the first receiving path and the second receiving path. The phase compensation circuit is configured to perform compensation on the first receiving signal or the second receiving signal according to the phase difference compensation signal when the receiving circuit performs beamforming signal receiving such that the first receiving signal and the second receiving signal substantially have identical phases after the compensation is performed.

The present invention also discloses a signal receiving apparatus operation method having phase compensation mechanism configured to perform non-sounding beamforming communication that includes steps outlined below. A RF training signal is generated by a RF training signal generation circuit. Phase compensation is performed by a receiving circuit to make a first receiving path and a second receiving path included by the receiving circuit electrically coupled to the RF training signal generation circuit such that the RF training signal serves as the input signal, and make the first receiving path and the second receiving path perform frequency down-conversion and analog-to-digital conversion according to the input signal to generate a first receiving signal and a second receiving signal. Cross-correlation operation is performed on the first receiving signal and the second receiving signal by a phase difference calculation circuit included by the receiving circuit when the receiving circuit performs phase compensation to generate a phase difference compensation signal according to a phase difference between the first receiving path and the second receiving path. A data signal transmitted by a signal transmitting apparatus is received by an antenna circuit. Beamforming signal receiving is performed by the receiving circuit to make the first receiving path and the second receiving path electrically coupled to the antenna circuit such that the data signal serves as the input signal, and make the first receiving path and the second receiving path perform frequency down-conversion and analog-to-digital conversion according to the input signal to generate the first receiving signal and the second receiving signal. Compensation is performed on the first receiving signal or the second receiving signal according to the phase difference compensation signal by a phase compensation circuit included by the receiving circuit such that the first receiving signal and the second receiving signal substantially have identical phases after the compensation is performed.

These and other objectives of the present invention will no doubt become obvious to those of ordinary skill in the art behind reading the following detailed description of the preferred embodiments that are illustrated in the various figures and drawings.

DETAILED DESCRIPTION OF THE PREFERRED EMBODIMENTS

An aspect of the present invention is to provide a signal receiving apparatus and a signal receiving apparatus operation method thereof having phase compensation mechanism to feed the RF training signal to different receiving paths and perform calculation to generate a phase compensation signal to compensate the phase difference between different receiving paths so as to further perform compensation on the received signal when beamforming signal receiving is performed. Additional channel state information measuring that causes the waste of time and resource costs can be avoided.

Figure 1:
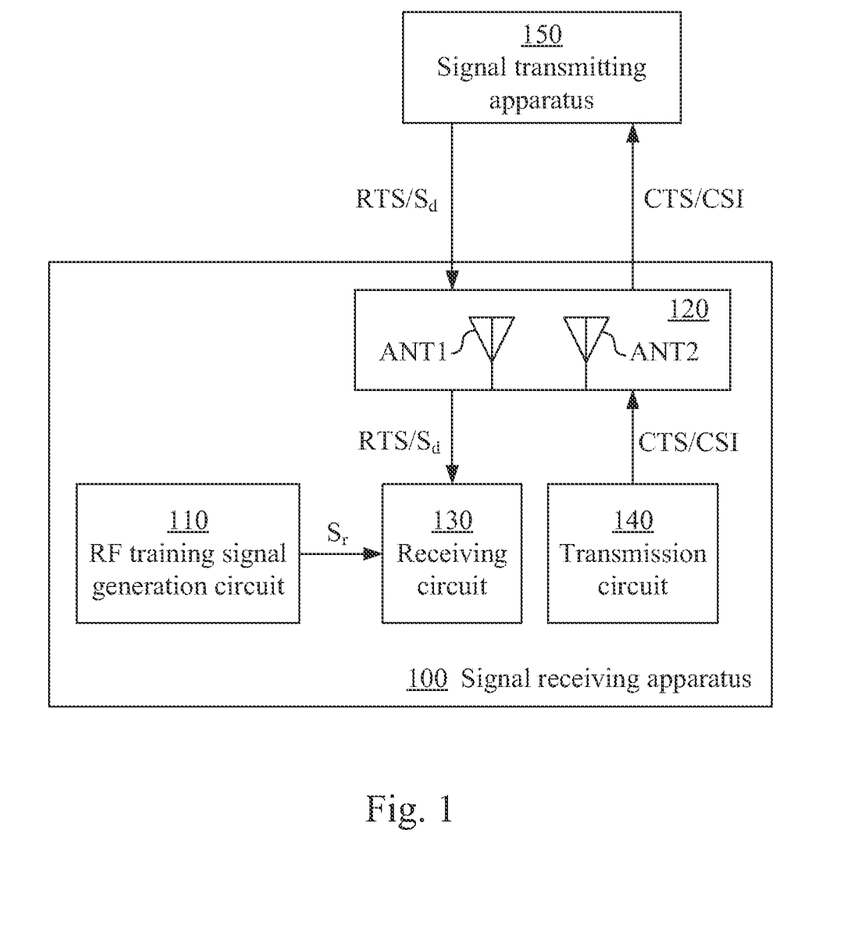
FIG. 1 illustrates a block diagram of the signal receiving apparatus having phase compensation mechanism and the signal transmitting apparatus according to an embodiment of the present invention.

Reference is now made to FIG. 1. FIG. 1 illustrates a block diagram of the signal receiving apparatus 100 having phase compensation mechanism and the signal transmitting apparatus 150 according to an embodiment of the present invention.

In an embodiment, the signal receiving apparatus 100 is a station device, and the signal transmitting apparatus 150 is an access point device. Both of the signal receiving apparatus 100 and the signal transmitting apparatus 150 are equipped with dual antenna. Corresponding to the dual antenna, each of the signal receiving apparatus 100 and the signal transmitting apparatus 150 has two transmission paths (T) and two receiving paths (R). Each of the signal receiving apparatus 100 and the signal transmitting apparatus 150 may only activate one transmission path and one receiving path to perform a single antenna communication (1T1R) or may activate two transmission paths and two receiving paths to perform dual antenna communication (two 1T1R) corresponding to different frequency bands or channels.

The signal receiving apparatus 100 and the signal transmitting apparatus 150 may also activate two transmission paths and two receiving paths to perform beamforming dual antenna communication (2T2R) at the same frequency band and the same channel. Under such a condition, the signal receiving apparatus 100 operates as a beamformee and the signal transmitting apparatus 150 operates as a beamformer. In an embodiment, either sounding beamforming communication or non-sounding beamforming communication can be performed between the signal receiving apparatus 100 and the signal transmitting apparatus 150.

In sounding beamforming communication, the signal receiving apparatus 100 measures and transmits channel state information CSI to the signal transmitting apparatus 150 such that the signal transmitting apparatus 150 performs beamforming signal transmission according to the channel state information CSI and the signal receiving apparatus 100 performs beamforming signal receiving accordingly.

In non-sounding beamforming communication, the signal receiving apparatus 100 does not need to measure the channel state information CSI. Instead, the signal receiving apparatus 100 performs phase compensation according to the phase compensation mechanism and performs beamforming signal receiving subsequently. In an embodiment, the signal receiving apparatus 100 and the signal transmitting apparatus 150 may perform non-sounding beamforming communication in a predetermined time after the sounding beamforming communication.

The signal receiving apparatus 100 may perform either a single 1T1R communication or two independent 1T1R communications in the predetermined time such that the phases of the receiving paths in the signal receiving apparatus 100 change. Nevertheless, the signal transmitting apparatus 150 can still perform beamforming signal transmission according to the existed channel state information CSI. The signal receiving apparatus 100 can perform beamforming signal receiving according to the phase compensation mechanism to compensate the change of the phases. Additional channel state information measuring that causes the waste of time and resource costs can be avoided.

The components included in the signal receiving apparatus 100 and how these components perform non-sounding beamforming communication are described in detail in the following paragraphs.

The signal receiving apparatus 100 includes a RF training signal generation circuit 110, an antenna circuit 120, a receiving circuit 130 and a transmission circuit 140.

The RF training signal generation circuit 110 is configured to generate a RF training signal $S_r$. In an embodiment, the RF training signal $S_r$ includes a part corresponding to a RF center frequency $f_c$ and a part corresponding to a training signal frequency $f_m$. More specifically, the RF training signal $S_r$ at the time t is expressed as $S_r(t)=e^{j2\pi(f_c+f_m)t}$.

In an embodiment, the RF center frequency $f_c$ is a center frequency of a communication that is going to be performed, and can be such as but not limited to 2.4 Gigahertz (GHz) or 5 GHz. The training signal frequency $f_m$ is within a baseband frequency range, such as but not limited to a several hundreds of kilohertz (KHz).

The antenna circuit 120 is configured to receive a data signal $S_d$ transmitted by the signal transmitting apparatus 150. In an embodiment, the antenna circuit 120 includes two antennas ANT1 and ANT2 to perform dual antenna communication of 2T2R.

Figure 2:
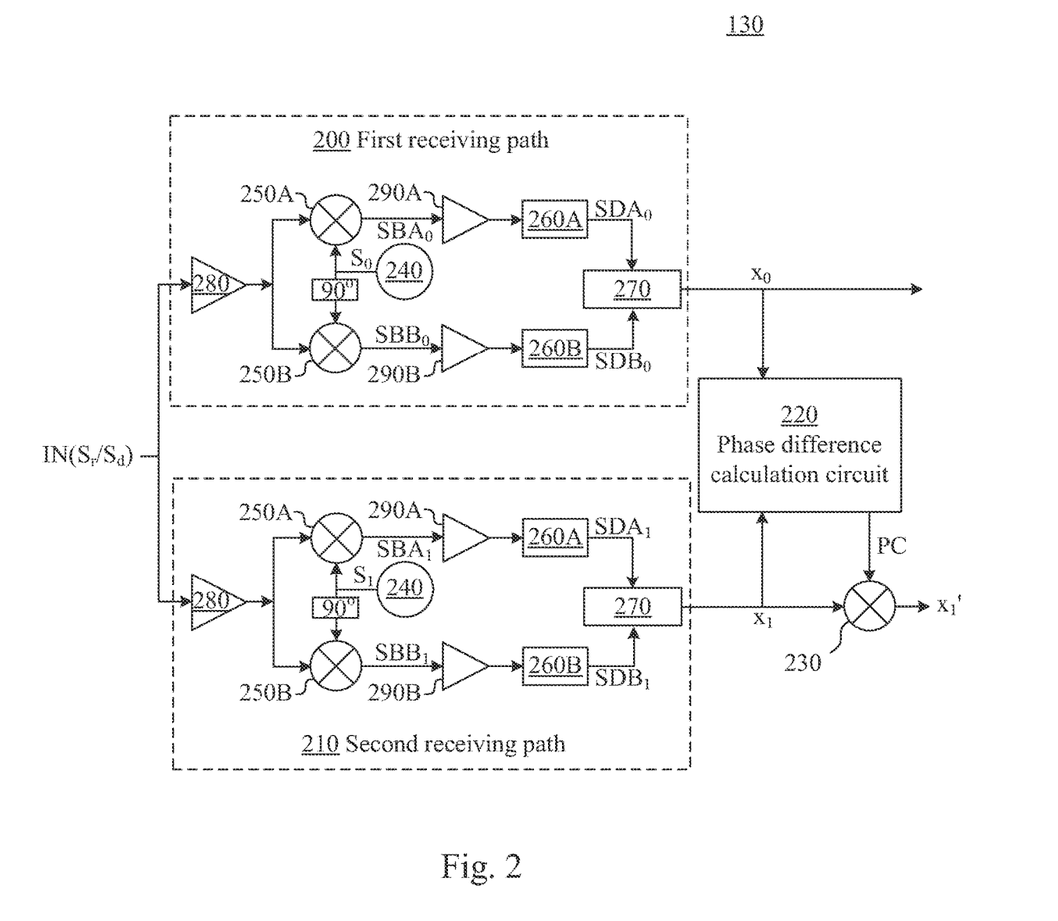
FIG. 2 illustrates a more detailed block diagram of the receiving circuit according to an embodiment of the present invention.

Reference is now made to FIG. 2. FIG. 2 illustrates a more detailed block diagram of the receiving circuit 130 according to an embodiment of the present invention. The receiving circuit 130 includes a first receiving path 200, a second receiving path 210, a phase difference calculation circuit 220 and a phase compensation circuit 230.

The first receiving path 200 and the second receiving path 210 are configured to perform frequency down-conversion and analog-to-digital conversion according to an input signal IN to generate a first receiving signal $x_0$ and a second receiving signal $x_1$. Take the first receiving path 200 as an example, the first receiving path 200 includes a frequency mixer 240, a multiplier 250A, a multiplier 250B, an analog-to-digital conversion circuit 260A, an analog-to-digital conversion circuit 260B and a mixing circuit 270.

The first receiving path 200 and the second receiving path 210 are electrically coupled to the RF training signal generation circuit 110 in FIG. 1 when the receiving circuit 130 performs phase compensation such that the RF training signal $S_r$ serves as the input signal IN.

The frequency mixer 240 is configured to generate a RF reference signal $S_0$ having a RF center frequency $f_c$. A first initial phase that the frequency mixer 240 has is $\theta_0$. As a result, the RF reference signal $S_0$ can be expressed as $S_0(t)=e^{-j2\pi f_c t+\theta_0}$.

The multiplier 250A and the multiplier 250B respectively multiply the RF reference signal $S_0$ and the input signal IN to perform frequency down-conversion to generate a first frequency down-converted signal $SBA_0$ and a second frequency down-converted signal $SBB_0$ having a phase difference of 90 degrees therebetween. In an embodiment, the multiplier 250A and the multiplier 250B may receive the input signal IN selectively through an amplifier circuit 280 further included in the receiving circuit 130.

The analog-to-digital conversion circuit 260A and the analog-to-digital conversion circuit 260B respectively perform analog-to-digital conversion on a first frequency down-converted signal $SBA_0$ and a second frequency down-converted signal $SBB_0$ to generate a first digital signal $SDA_0$ and a second digital signal $SDB_0$. In an embodiment, the analog-to-digital conversion circuit 260A and the analog-to-digital conversion circuit 260B may receive the first frequency down-converted signal $SBA_0$ and the second frequency down-converted signal $SBB_0$ selectively through amplifier circuits 290A and 290B further included in the receiving circuit 130.

The mixing circuit 270 is configured to mix the first digital signal $SDA_0$ and the second digital signal $SDB_0$ to generate the first receiving signal $x_0$. When the receiving circuit 130 performs phase compensation and receives the RF training signal $S_r$ as the input signal IN, the N-th sampling point of the first receiving signal $x_0$ corresponding to a sampling period $T_s$ (i.e., an inverse of a sampling frequency of the analog-to-digital conversion circuit 260A and the analog-to-digital conversion circuit 260B) is $x_0(n)=S_r(nT_s) \cdot S_0(nT_s)=e^{j2\pi f_m nT_s + \theta_0}$.

The second receiving path 210 includes components identical to those included in the first receiving path 200, in which these components include identical labels in FIG. 2. However, the frequency mixer 240 of the second receiving path 210 has a second initial phase of $\theta_1$ such that the RF reference signal $S_1$ generated thereby is expressed as $S_1(t)=e^{-j2\pi f_c t + \theta_1}$.

Further, after the processing of the multiplier 250A and the multiplier 250B that generates a first frequency down-converted signal $SBA_1$ and a second frequency down-converted signal $SBB_1$ and after the processing of the analog-to-digital conversion circuit 260A and the analog-to-digital conversion circuit 260B that generates a first digital signal $SDA_1$ and a second digital signal $SDB_1$, the mixing circuit 270 generates the second receiving signal $x_1$ accordingly. When the receiving circuit 130 performs phase compensation and receives the RF training signal $S_r$ as the input signal IN, the N-th sampling point of the second receiving signal $x_1$ corresponding to the sampling period $T_s$ is $x_1(n)=S_r(nT_s) \cdot S_1(nT_s)=e^{j2\pi f_m nT_s + \theta_1}$.

The phase difference calculation circuit 220 is configured to perform cross-correlation operation on the first receiving signal $x_0$ and the second receiving signal $x_1$ when the receiving circuit 130 performs phase compensation to generate a phase difference compensation signal PC. The phase difference compensation signal PC a phase difference $\Delta\theta$ between the first initial phase $\theta_0$ corresponding to the first receiving path 200 and the second initial phase $\theta_1$ corresponding to the second receiving path 210 and is expressed as $e^{-j\Delta\theta}$. The phase difference $\Delta\theta$ is $\theta_0 - \theta_1$.

In an embodiment, the phase difference calculation circuit 220 performs cross-correlation operation according to the N-th sampling points of the first receiving signal $x_0$ and the second receiving signal $x_1$ by using a formula of $$e^{j(\theta_1 - \theta_0)} = \frac{1}{N} \sum_{n=0}^{N-1} x_0^*(n) x_1(n)$$

to generate the phase difference compensation signal PC.

When the receiving circuit 130 performs beamforming signal receiving, the first receiving path 200 and the second receiving path 210 are electrically coupled to the antenna circuit 120 in FIG. 1 such that the data signal $S_d$ serves as the input signal IN. Under such a condition, each of the first receiving path 200 and the second receiving path 210 performs receiving corresponding to one of the antennas ANT1 and ANT2 included in the antenna circuit 120.

After the data signal $S_d$ is processed by the first receiving path 200 and the second receiving path 210, the phase difference $\Delta\theta$ is also presented between the first receiving signal $x_0$ and the second receiving signal $x_1$ generated according to the data signal $S_d$.

As a result, the phase compensation circuit 230 is configured to perform compensation on one of the first receiving signal $x_0$ and the second receiving signal $x_1$ according to the phase difference compensation signal PC when the receiving circuit 130 performs beamforming signal receiving, such that the first receiving signal $x_0$ and the second receiving signal $x_1$ substantially have identical phases after the compensation is performed. It is appreciated that the term 'substantially' means that the phases of the first receiving signal $x_0$ and the second receiving signal $x_1$ after the compensation is performed are not necessarily completely the same and may include an error within a reasonable range.

In FIG. 2, the second receiving signal $x_1'$ generated according to the compensation performed on the second receiving signal $x_1$ by the phase compensation circuit 230 based on the phase difference compensation signal PC is exemplarily illustrated. However, in other embodiments, the compensation may selectively be performed on the first receiving signal $x_0$ by the phase compensation circuit 230 based on the phase difference compensation signal PC. The present invention is not limited thereto.

In an embodiment, the transmission circuit 140 also includes two transmission paths (not illustrated in the figure) corresponding to the two antennas ANT1 and ANT2 that are configured to transmit related signals to the signal transmitting apparatus 150 when the signal receiving apparatus 100 performs either sounding beamforming communication or non-sounding beamforming communication.

In an embodiment, when non-sounding beamforming communication is performed, the receiving circuit 130 is further configured to receive a request-to-send signal RTS transmitted by the signal transmitting apparatus 150 such that the transmission circuit 140 returns a clear-to-send signal CTS to the signal transmitting apparatus 150. The receiving circuit 130 performs phase compensation during a short interframe space (SIFS) after the transmission circuit 140 returns the clear-to-send signal CTS and performs beamforming signal receiving after the short interframe space.

In an embodiment, the signal receiving apparatus 100 is further configured to perform sounding beamforming communication to receive the request-to-send signal RTS from the signal transmitting apparatus 150 such that the transmission circuit 140 returns clear-to-send signal CTS to the signal transmitting apparatus 150, so as to measure and transmit channel state information CSI to the signal transmitting apparatus 150 such that the signal transmitting apparatus 150 performs beamforming signal transmission and the receiving circuit 130 performs beamforming signal receiving accordingly. The signal receiving apparatus 100 is further configured to perform non-sounding beamforming communication with the signal transmitting apparatus 150 in a predetermined time after the sounding beamforming communication.

Figure 3:
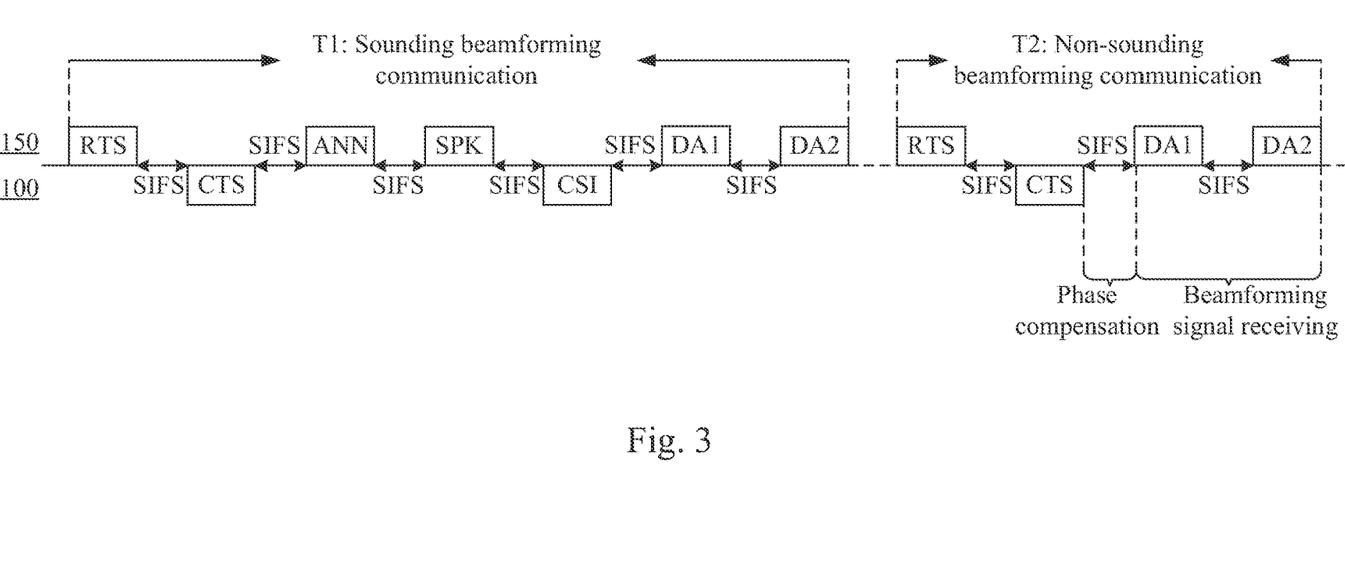
FIG. 3 illustrates a signal timing diagram of a communication performed between the signal receiving apparatus and the signal transmitting apparatus according to an embodiment of the present invention.

Reference is now made to FIG. 3 to describe the communication between the signal receiving apparatus 100 and the signal transmitting apparatus 150 in detail.

FIG. 3 illustrates a signal timing diagram of a communication performed between the signal receiving apparatus 100 and the signal transmitting apparatus 150 according to an embodiment of the present invention. Above the timeline, the signals transmitted from the signal transmitting apparatus 150 to the signal receiving apparatus 100 are illustrated. Below the timeline, the signals transmitted from the signal receiving apparatus 100 to the signal transmitting apparatus 150 are illustrated.

In a time interval T1, the signal receiving apparatus 100 and the signal transmitting apparatus 150 perform sounding beamforming communication.

At first, the signal receiving apparatus 100 receives the request-to-send signal RTS transmitted by the signal transmitting apparatus 150 and returns the clear-to-send signal CTS to the signal transmitting apparatus 150.

Subsequently, the signal receiving apparatus 100 starts to measure the channel state information CSI. In an embodiment, the signal receiving apparatus 100 may perform measuring according to the sounding packets transmitted from the signal transmitting apparatus 150, in which the sounding packets can be extremely high throughput null data packets. More specifically, the signal receiving apparatus 100 may receive an announcing signal ANN announcing the packets to be transmitted by the signal transmitting apparatus 150 and receive the sounding packets SPK subsequently to measure and transmit the channel state information CSI.

Further, the signal transmitting apparatus 150 performs beamforming signal transmission according to the channel state information CSI such that the receiving circuit 130 performs beamforming signal receiving accordingly to accomplish the object of data transmission. In the present embodiment, the receiving circuit 130 receives two pieces of data DA1 and DA2.

It is appreciated that a short interframe space SIFS is included in each two neighboring signal transmissions.

In a time interval T2 that is in a predetermined time after the time interval T1, the signal receiving apparatus 100 and the signal transmitting apparatus 150 perform non-sounding beamforming communication. In such a time interval T2, the signal receiving apparatus 100 may perform a single 1T1R communication or two independent 1T1R communications to cause the change of the phases of the receiving paths in the signal receiving apparatus 100. Subsequently, the signal receiving apparatus 100 performs non-sounding beamforming communication according to the request-to-send signal RTS transmitted by the signal transmitting apparatus 150.

After receiving the request-to-send signal RTS, the signal receiving apparatus 100 returns the clear-to-send signal CTS to the signal transmitting apparatus 150. The receiving circuit 130 performs phase compensation during the short interframe space SIFS after the transmission circuit 140 returns the clear-to-send signal CTS and performs beamforming signal receiving after the short interframe space SIFS. In the present embodiment, the receiving circuit 130 receives two pieces of data DA1 and DA2. As a result, even if the signal receiving apparatus 100 performs other communications that cause the change of the phases of the receiving paths, the change of the phases can be compensated based on the method described above. Additional channel state information measuring that causes the waste of time and resource costs can be avoided.

In an embodiment, in a predetermined time after the time interval T1, the signal receiving apparatus 100 and the signal transmitting apparatus 150 may perform a multiple times of non-sounding beamforming communication. After the predetermined time, the condition of the channel between the signal receiving apparatus 100 and the signal transmitting apparatus 150 may vary a lot. Under such a condition, the signal receiving apparatus 100 and the signal transmitting apparatus 150 may perform sounding beamforming communication again to measure the channel state information CSI. The non-sounding beamforming communication can be further performed in the predetermined time after the sounding beamforming communication.

It is appreciated that different lengths of the predetermined time can be set according to the environment that the signal receiving apparatus 100 and the signal transmitting apparatus 150 locate. For example, in a more stable environment (e.g., inside a room), the length of the predetermined time is set to be longer. In a more unstable environment (e.g., outside a room), the length of the predetermined time is set to be shorter.

As a result, the signal receiving apparatus of the present invention can feed the RF training signal to different receiving paths and perform calculation to generate a phase compensation signal to compensate the phase difference between different receiving paths so as to further perform compensation on the received signal when beamforming signal receiving is performed. Additional channel state information measuring that causes the waste of time and resource costs can be avoided.

Figure 4:
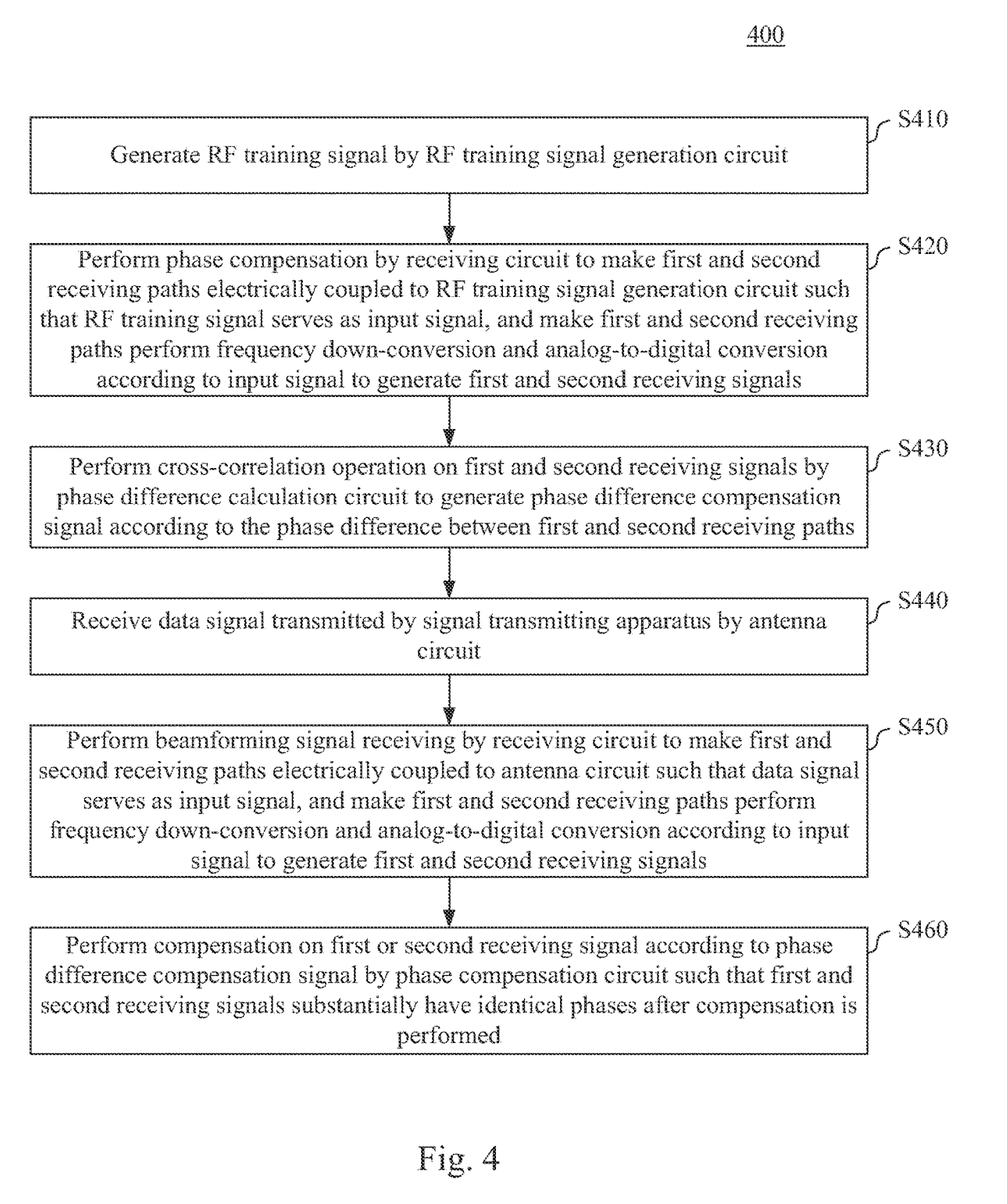
FIG. 4 illustrates a flow chart of a signal receiving apparatus operation method having phase compensation mechanism according to an embodiment of the present invention.

FIG. 4 illustrates a flow chart of a signal receiving apparatus operation method 400 having phase compensation mechanism according to an embodiment of the present invention. The signal receiving apparatus operation method 400 is configured to perform non-sounding beamforming communication and is used in such as but not limited to the signal receiving apparatus 100 in FIG. 1. As illustrated in FIG. 4, an embodiment of the signal receiving apparatus operation method 400 includes the following steps.

In step S410, the RF training signal $S_r$ is generated by the RF training signal generation circuit 110.

In step S420, phase compensation is performed by the receiving circuit 130 to make the first receiving path 200 and the second receiving path 210 included by the receiving circuit 130 electrically coupled to the RF training signal generation circuit 110 such that the RF training signal $S_r$ serves as the input signal IN, and make the first receiving path 200 and the second receiving path 210 perform frequency down-conversion and analog-to-digital conversion according to the input signal IN to generate the first receiving signal $x_0$ and the second receiving signal $x_1$.

In step S430, cross-correlation operation is performed on the first receiving signal $x_0$ and the second receiving signal $x_1$ by the phase difference calculation circuit 220 included by the receiving circuit 130 to generate the phase difference compensation signal PC according to the phase difference between the first receiving path 200 and the second receiving path 210.

In step S440, the data signal $S_d$ transmitted by the signal transmitting apparatus 150 is received by the antenna circuit 130.

In step S450, beamforming signal receiving is performed by the receiving circuit 130 to make the first receiving path 200 and the second receiving path 210 electrically coupled to the antenna circuit 120 such that the data signal $S_d$ serves as the input signal IN, and make the first receiving path 200 and the second receiving path 210 perform frequency down-conversion and analog-to-digital conversion according to the input signal IN to generate the first receiving signal $x_0$ and the second receiving signal $x_1$.

In step S460, compensation is performed on the first receiving signal $x_0$ or the second receiving signal $x_1$ according to the phase difference compensation signal PC by the phase compensation circuit 230 included by the receiving circuit 130 such that the first receiving signal $x_0$ and the second receiving signal $x_1$ substantially have identical phases after the compensation is performed.

It is appreciated that the embodiments described above are merely an example. In other embodiments, it should be appreciated that many modifications and changes may be made by those of ordinary skill in the art without departing, from the spirit of the disclosure.

In summary, the present invention discloses the signal receiving apparatus and the signal receiving apparatus operation method thereof having phase compensation mechanism that feed the RF training signal to different receiving paths and perform calculation to generate a phase compensation signal to compensate the phase difference between different receiving paths so as to further perform compensation on the received signal when beamforming signal receiving is performed. Additional channel state information measuring that causes the waste of time and resource costs can be avoided.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A signal receiving apparatus having phase compensation mechanism configured to perform non-sounding beamforming communication, comprising:
    an RF training signal generation circuit configured to generate a RF training signal;
    an antenna circuit configured to receive a data signal transmitted by a signal transmitting apparatus; and
    a receiving circuit comprising:
        a first receiving path and a second receiving path configured to perform frequency down-conversion and analog-to-digital conversion according to an input signal to generate a first receiving signal and a second receiving signal, wherein the first receiving path and the second receiving path are electrically coupled to the RF training signal generation circuit when the receiving circuit performs phase compensation such that the RF training signal serves as the input signal, and are electrically coupled to the antenna circuit when the receiving circuit performs beamforming signal receiving such that the data signal serves as the input signal;
        a phase difference calculation circuit configured to perform cross-correlation operation on the first receiving signal and the second receiving signal when the receiving circuit performs phase compensation to generate a phase difference compensation signal according to a phase difference between the first receiving path and the second receiving path; and
        a phase compensation circuit configured to perform compensation on the first receiving signal or the second receiving signal according to the phase difference compensation signal when the receiving circuit performs beamforming signal receiving such that the first receiving signal and the second receiving signal substantially have identical phases after the compensation is performed.

2. The signal receiving apparatus of claim 1, wherein each of the first receiving path and the second receiving path comprises:
    a frequency mixer configured to generate a RF reference signal having a RF center frequency;
    two multipliers respectively configured to multiply the RF reference signal and the input signal to perform frequency down-conversion to generate a first frequency down-converted signal and a second frequency down-converted signal having a phase difference of 90 degrees therebetween;
    two analog-to-digital conversion circuits to respectively perform analog-to-digital conversion on the first frequency down-converted signal and the second frequency down-converted signal to generate a first digital signal and a second digital signal; and
    a mixing circuit configured to mix the first digital signal and the second digital signal to generate one of the first receiving signal and the second receiving signal.

3. The signal receiving apparatus of claim 2, wherein when the receiving circuit performs phase compensation, the RF center frequency is $f_c$, a training signal frequency is $f_m$, a first initial phase that the frequency mixer of the first receiving path has is $\theta_0$, a second initial phase that the frequency mixer of the second receiving path has is $\theta_1$, the RF training signal is $S_r(t)=e^{j2\pi(f_c+f_m)t}$, the RF reference signal corresponding to the first receiving path is $S_0(t)=e^{-j2\pi f_c t+\theta_0}$, the RF reference signal corresponding to the second receiving path is $S_1(t)=e^{-j2\pi f_c t+\theta_1}$, the phase difference is $\Delta\theta=\theta_0-\theta_1$, and the phase difference compensation signal is $e^{-j\Delta\theta}$;
    wherein the N-th sampling point of the first receiving signal corresponding to a sampling period $T_s$ is $x_0(n)=S_r(nT_s)\cdot S_0(nT_s)=e^{j2\pi f_m nT_s+\theta_0}$, and the N-th sampling point of the second receiving signal corresponding to the sampling period $T_s$ is $x_1(n)=S_r(nT_s)\cdot S_1(nT_s)=e^{j2\pi f_m nT_s+\theta_1}$.

4. The signal receiving apparatus of claim 3, wherein the phase difference calculation circuit performs cross-correlation operation according to the N-th sampling points of the first receiving signal and the second receiving signal by using a formula of $$e^{j(\theta_1-\theta_0)} = \frac{1}{N}\sum_{n=0}^{N-1} x_0^*(n)x_1(n)$$

to generate the phase difference compensation signal.

5. The signal receiving apparatus of claim 3, wherein the RF center frequency is 2.4 GHz or 5 GHz, and the training signal frequency is within a baseband frequency range.

6. The signal receiving apparatus of claim 1, wherein the receiving circuit is further configured to receive a request-to-send signal from the signal transmitting apparatus such that a transmission circuit comprised by the signal receiving apparatus returns a clear-to-send (CTS) signal to the signal transmitting apparatus;
    wherein the receiving circuit performs phase compensation during a short interframe space (SIFS) after the transmission circuit returns the clear-to-send signal and performs beamforming signal receiving after the short interframe space.

7. The signal receiving apparatus of claim 6, wherein the signal receiving apparatus is further configured to perform sounding beamforming communication to receive the request-to-send signal from the signal transmitting apparatus such that the transmission circuit returns the clear-to-send signal to the signal transmitting apparatus, so as to measure and transmit channel state information to the signal transmitting apparatus such that the signal transmitting apparatus performs beamforming signal transmission and the receiving circuit performs beamforming signal receiving accordingly;

wherein the signal receiving apparatus is further configured to perform non-sounding beamforming communication with the signal transmitting apparatus in a predetermined time after the sounding beamforming communication.

8. A signal receiving apparatus operation method having phase compensation mechanism configured to perform non-sounding beamforming communication, comprising:

generating a RF training signal by a RF training signal generation circuit;

performing phase compensation by a receiving circuit to make a first receiving path and a second receiving path comprised by the receiving circuit electrically coupled to the RF training signal generation circuit such that the RF training signal serves as the input signal, and make the first receiving path and the second receiving path perform frequency down-conversion and analog-to-digital conversion according to the input signal to generate a first receiving signal and a second receiving signal;

performing cross-correlation operation on the first receiving signal and the second receiving signal by a phase difference calculation circuit comprised by the receiving circuit when the receiving circuit performs phase compensation to generate a phase difference compensation signal according to a phase difference between the first receiving path and the second receiving path;

receiving a data signal transmitted by a signal transmitting apparatus by an antenna circuit;

performing beamforming signal receiving by the receiving circuit to make the first receiving path and the second receiving path electrically coupled to the antenna circuit such that the data signal serves as the input signal, and make the first receiving path and the second receiving path perform frequency down-conversion and analog-to-digital conversion according to the input signal to generate the first receiving signal and the second receiving signal; and performing compensation on the first receiving signal or the second receiving signal according to the phase difference compensation signal by a phase compensation circuit comprised by the receiving circuit such that the first receiving signal and the second receiving signal substantially have identical phases after the compensation is performed.

9. The signal receiving apparatus operation method of claim 8, further comprising:

generating a RF reference signal having a RF center frequency by a frequency mixer comprised by each of the first receiving path and the second receiving path;

respectively multiplying the RF reference signal and the input signal to perform frequency down-conversion to generate a first frequency down-converted signal and a second frequency down-converted signal having a phase difference of 90 degrees therebetween by two multipliers comprised by each of the first receiving path and the second receiving path;

respectively performing analog-to-digital conversion on the first frequency down-converted signal and the second frequency down-converted signal to generate a first digital signal and a second digital signal by two analog-to-digital conversion circuits comprised by each of the first receiving path and the second receiving path; and mixing the first digital signal and the second digital signal to generate one of the first receiving signal and the second receiving signal by a mixing circuit comprised by each of the first receiving path and the second receiving path.

10. The signal receiving apparatus operation method of claim 9, wherein when the receiving circuit performs phase compensation, the RF center frequency is $f_c$, a training signal frequency is $f_m$, a first initial phase that the frequency mixer of the first receiving path has is $\theta_0$, a second initial phase that the frequency mixer of the second receiving path has is $\theta_1$, the RF training signal is $S_r(t)=e^{j2\pi(f_c+f_m)t}$, the RF reference signal corresponding to the first receiving path is $S_0(t)=e^{-j2\pi f_c t+\theta_0}$, the RF reference signal corresponding to the second receiving path is $S_1(t)=e^{-j2\pi f_c t+\theta_1}$, the phase difference is $\Delta\theta=\theta_0-\theta_1$, and the phase difference compensation signal is $e^{-j\Delta\theta}$;

wherein the N-th sampling point of the first receiving signal corresponding to a sampling period $T_s$ is $x_0(n)=S_r(nT_s)\cdot S_0(nT_s)=e^{j2\pi f_m nT_s+\theta_0}$, and the N-th sampling point of the second receiving signal corresponding to the sampling period $T_s$ is $x_1(n)=S_r(nT_s)\cdot S_1(nT_s)=e^{j2\pi f_m nT_s+\theta_1}$.

11. The signal receiving apparatus operation method of claim 10, further comprising:

performing cross-correlation operation according to the N-th sampling points of the first receiving signal and the second receiving signal by using a formula of $$e^{j(\theta_1-\theta_0)} = \frac{1}{N}\sum_{n=0}^{N-1} x_0^*(n)x_1(n)$$

to generate the phase difference compensation signal by the phase difference calculation circuit.

12. The signal receiving apparatus operation method of claim 10, wherein the RF center frequency is 2.4 GHz or 5 GHz, and the training signal frequency is within a baseband frequency range.

13. The signal receiving apparatus operation method of claim 8, further comprising:

receiving a request-to-send signal from the signal transmitting apparatus by the receiving circuit such that a transmission circuit comprised by the signal receiving apparatus returns a clear-to-send signal to the signal transmitting apparatus; and performing phase compensation during a short interframe space after the transmission circuit returns the clear-to-send signal and performing beamforming signal receiving after the short interframe space by the receiving circuit.

14. The signal receiving apparatus operation method of claim 13, further comprising:

performing sounding beamforming communication by the signal receiving apparatus to receive the request-to-send signal from the signal transmitting apparatus such that the transmission circuit returns the clear-to-send signal to the signal transmitting apparatus, so as to measure and transmit channel state information to the signal transmitting apparatus such that the signal transmitting apparatus performs beamforming signal transmission and the receiving circuit performs beamforming signal receiving accordingly; and performing non-sounding beamforming communication with the signal transmitting apparatus in a predetermined time after the sounding beamforming communication by the signal receiving apparatus.

* * * * *